United States Patent [19]
Zombo et al.

[11] Patent Number: 5,979,220
[45] Date of Patent: Nov. 9, 1999

[54] IN-SITU SENSORS FOR GAS TURBINES

[75] Inventors: Paul John Zombo, Cocoa, Fla.; Peter Gerald Marsh, Cottage Grove, Minn.

[73] Assignee: Siemens Westinghouse Power Corporation, Orlando, Fla.

[21] Appl. No.: 09/109,249

[22] Filed: Jun. 30, 1998

[51] Int. Cl.[6] .............................. F02C 7/30; G01F 1/68; F25B 21/02; G01K 11/02
[52] U.S. Cl. ...................... 73/23.2; 73/204.22; 73/23.31; 165/272; 60/39.75
[58] Field of Search ................................ 73/23.2, 204.22, 73/204.23, 23.31, 23.32; 60/39.5, 39.75, 317; 165/183, 272

[56] References Cited

U.S. PATENT DOCUMENTS

| | | | |
|---|---|---|---|
| 3,808,795 | 5/1974 | Lucas | 60/39.5 |
| 4,067,237 | 1/1978 | Arcella et al. | 73/204 |
| 4,620,421 | 11/1986 | Brown et al. | 62/3 |
| 4,661,211 | 4/1987 | Petty-Weeks | 204/1 T |
| 4,689,122 | 8/1987 | Polak et al. | 204/1 T |
| 4,706,908 | 11/1987 | Huffman et al. | 244/118.5 |
| 4,976,135 | 12/1990 | Stock | 73/23.2 |
| 5,131,260 | 7/1992 | Brand et al. | 73/23.2 |
| 5,333,677 | 8/1994 | Molivadas | 165/32 |
| 5,415,025 | 5/1995 | Bartman et al. | 73/23.2 |
| 5,635,626 | 6/1997 | Hammond et al. | 73/23.2 |
| 5,809,911 | 9/1998 | Feizollahi | 110/346 |

*Primary Examiner*—Hezron Williams
*Assistant Examiner*—J. David Wiggins
*Attorney, Agent, or Firm*—Eckert Seamans Cherin & Mellott, LLC

[57] ABSTRACT

A sensing device for protecting a sensor from environmental conditions present in a turbine is provided. The sensing device comprises a heat pipe exposed to the environmental conditions for protecting the sensor from these conditions. The sensing device further comprises a sensor located in a center channel of the heat pipe and a working fluid located in an annulus of the heat pipe to aid in regulating heat along the length of the heat pipe. In alternate embodiments, the sensing device further comprises power wires extending from a power source outside the turbine to the sensor for supplying power to the sensor, and signal wires extending from the sensor to a data acquisition system outside the turbine for transmitting readings from the sensor to the data acquisition system.

11 Claims, 2 Drawing Sheets

IN-SITU SENSORS FOR GAS TURBINES

FIELD OF THE INVENTION

The present invention relates generally to gas turbines, and more particularly to the use of sensors in the harsh environmental conditions of a gas turbines.

BACKGROUND OF THE INVENTION

As those skilled in the art of combustion turbines are aware, the maximum power output of a gas turbine is achieved by heating the gas flowing through the combustion section to as high a temperature as is feasible. The hot gas, however, heats the various turbine components, such as transitions, vane segments, ring segments, and blades, that it passes when flowing through the turbine. Such components are critical components because their failure has direct impact on the operation and efficiency of the turbine.

Accordingly, the ability to increase the combustion firing temperature is limited by the ability of the critical components to withstand increased temperatures. Consequently, monitoring the state of the hot gas flowing through the turbine and the critical components themselves is essential to determine the state of the turbine's critical components as well as to determine the efficiency of the turbine.

The harsh environmental conditions inside the turbine, however, makes measurement of these conditions and components rather difficult. Many sensors are limited to operating below certain temperatures, can only function in stable environments, or can only operate for short periods of time in severe conditions. Consequently, the difficulty in accurately monitoring critical components of a gas turbine leads to inefficient turbine operation and significant downtime for off-line inspection of components. It is, therefore, desirable to provide an apparatus that can be used to protect sensors in the harsh environment of gas turbines so that the sensors can operate effectively.

SUMMARY OF THE INVENTION

A device for protecting a sensor from environmental conditions present in a turbine is provided. This sensing device comprises a heat pipe exposed to the environmental conditions for protecting the sensor from the environmental conditions. The heat pipe has a length, a hollow side wall defining an annulus, and a center channel. The sensing device further comprises a sensor located in the center channel of the heat pipe and a working fluid located in the annulus to aid in regulating heat along the length of the heat pipe.

In alternate embodiments, the sensing device further comprises power wires extending from a power source outside the turbine to the sensor for supplying power to the sensor, and signal wires extending from the sensor to a data acquisition system outside the turbine for transmitting readings from the sensor to the data acquisition system.

In other alternate embodiments, the heat pipe further comprises a first end and a second end, wherein the heat pipe is open at both the first end and the second end. In still other alternate embodiments, the heat pipe is closed at both the first end and the second end, but has a window on the first end for the sensor to sense the environment through the window. In these latter embodiments, the sensor may be an optical sensor or a thermal sensor.

In other alternate embodiments, the heat pipe has a first end and a semi-permeable membrane on the first end to allow entry of a specific species into the heat pipe for measurement by the sensor. In yet other alternate embodiments, the heat pipe further comprises a first end and a low flow inlet on the first end to allow a sample of working gas in the turbine to flow though the heat pipe at a low flow rate. In these latter embodiments, the sensor may be an oxygen/pH measuring cell for measuring the oxygen and pH levels in condensate in the sample of working gas.

Specific applications are also disclosed such as those in which the sensing devices of the present invention can replace thermocouples in measuring a combustion turbine's exhaust temperatures by using the heat pipe to average the temperature over an area of this environment. To accomplish this, the sensing device of the present invention may comprise a heat pipe located in an exhaust cylinder of a turbine and extend from the exhaust cylinder to an exit nozzle. In addition, the heat pipe may be in the shape of ring and be situated about the inside circumference of the exhaust cylinder of the turbine.

DETAILED DESCRIPTION OF THE PREFERRED EMBODIMENTS

The present invention protects sensors in the harsh environment of gas turbines by using heat pipes. Heat pipes are commercially available heat transferring and regulating devices, having extremely high thermal conductivities. Typically, heat pipes, are closed cylindrical vessels which are filled with a working fluid that transfers or regulates temperature differentials. A variety of shapes, sizes and working fluids can be used, however, for different applications and requirements.

Figure 2:
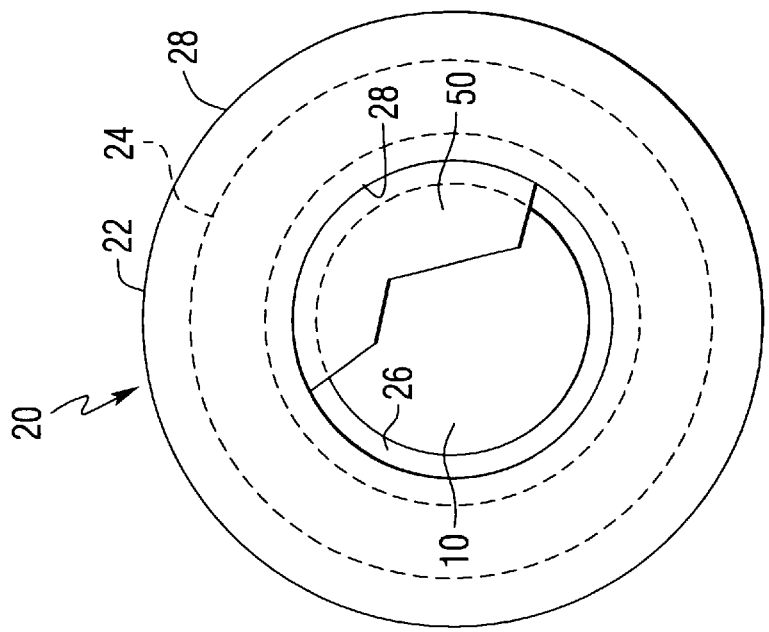
FIG. 2 is an axial view of the sensing device of FIG. 1.
Figure 1:
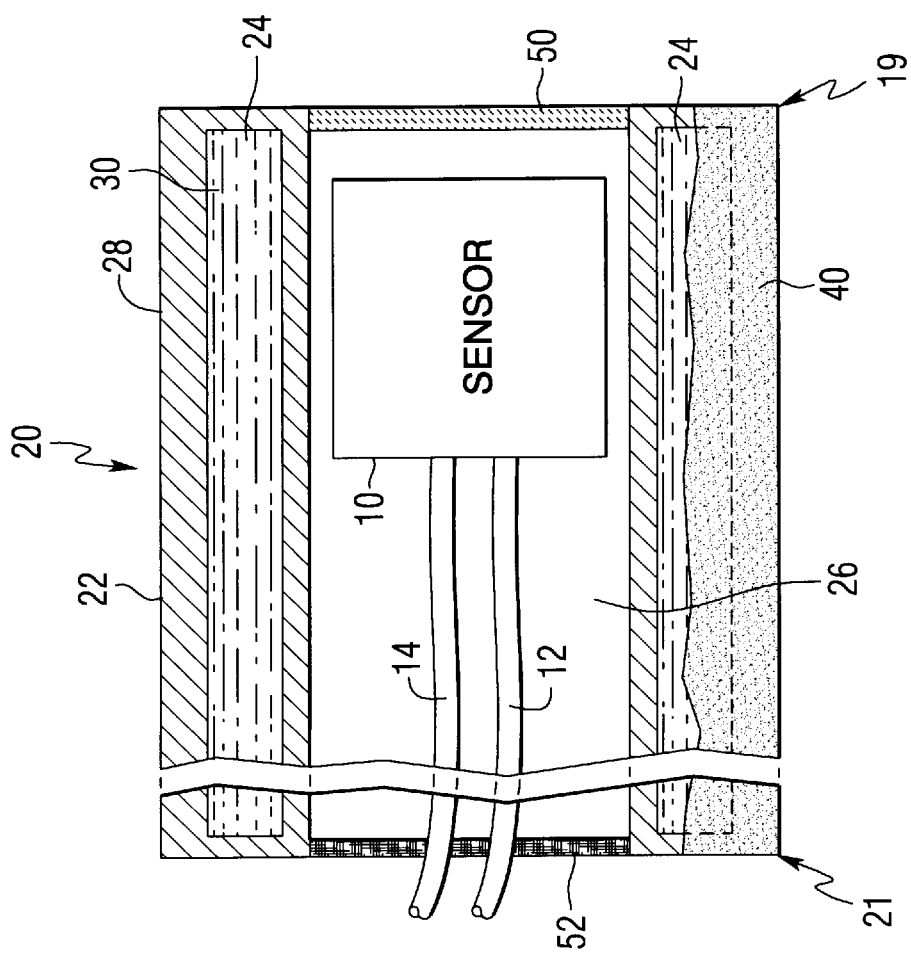
FIG. 1 is a cross-sectional, side view of a sensing device according to the present invention.

A cross-sectional, side view of a preferred embodiment of the sensing device of the present invention is shown in FIG. 1. An axial view of the sensing device of FIG. 1 is shown in FIG. 2. The sensing device comprises a sensor 10, a heat pipe 20 for protecting the sensor 10, power wires 12 for supplying power to the sensor 10 from a power source outside the turbine, and signal wires 14 for transmitting the readings from the sensor 10 to a data acquisition system (not shown) outside the turbine.

The heat pipe 20 comprises a cylinder 22 having an annulus 24 in its side wall 28 and a hollow center channel 26 for housing the sensor 10. The side wall 28 is also hollow to define the annulus 24. Instead of a working fluid in the center channel 26 of the heat pipe 20 to aid in regulating heat, the annulus 24 of the present invention is filled with the working fluid 30.

Signal wires 14 use the center channel 26 of the heat pipe 20 as a protective conduit to transmit the inherently weak readings from the sensor 10 out of the turbine. In situations where specialty signal wires, like coaxial cable, are needed, the heat pipe 20 makes signal transmission possible. This is only accomplished due to protection gained through the thermal isolation provided by use of the heat pipe 20 because the coaxial cable, like the sensor 10, cannot operate in aggressive environments.

Typically, a first side 19 of the heat pipe 20 will be in a hotter region than a second side 21 and it will regulate itself to achieve an average temperature along its length. Thus, to measure something in a hot area in the inside of a turbine, the end of the heat pipe 19 where the sensor 10 is positioned is placed in the hot area and the other end 21 of the heat pipe 20 is placed in a cooler area. In this manner, a temperature limited sensor will be able to operate properly in a high temperature area. Without the use of the heat pipe 20, most sensors 10 will not be able to withstand the severe conditions of the inside of a turbine.

In addition to being made of various shapes and sizes, heat pipes can be made to be flexible, so the sensing devices can be positioned and bent around obstructions to place the sensors 10 in a wide range of locations inside a turbine. To further lower the temperature of the high temperature side of the heat pipe 20, the external surface 40 (only bottom surface shown in FIG. 1) of the side wall 28 of the cylinder 22 can be manufactured of ceramic or other material having a low conductivity. Alternatively, a thermal insulating coating (or thermal barrier coating) can be used to coat the outer surface 40 of the side wall 28 of the high temperature side of the heat pipe 20 to further lower the temperature of the high temperature end.

In addition to the heat transferring properties of the heat pipe 20, the heat pipe also serves to physically protect the sensor 10 from the harsh conditions in a turbine. Because the side wall 28 physically protects the sensor 10 circumferentially about the heat pipe 20, the sensor is only exposed to the harsh conditions of the turbine through open ends of the heat pipe 20.

When the working gas flows through an open end, its temperature will be reduced by the time it reaches the sensor 10. In one embodiment, the working gas of the turbine will be allowed to flow into the heat pipe 20 through a low flow inlet in the first end 19 and flows out of the heat pipe 20 through a low flow exhaust in the second end 21. In this embodiment, the temperature of the working gas can be further reduced before it reaches the sensor 10.

For use with particular sensors, the ends of the heat pipe 20 will be closed the first end having a window 50. Preferably, the window is circular and is made of sapphire or quartz glass. Because objects emit a band of thermal energy at different wavelengths depending on its temperature, a thermal sensor can detect thermal wavelengths through the window 50. For example, a thermal sensor sensitive to thermal wavelengths of approximately 3–5 microns can detect such wavelengths through a sapphire window that allows the transmittance of 3–5 microns.

An optical sensor can also detect wavelengths, which is also dependent on the window 50 selected. In this arena, the sensing device of the present invention is particularly helpful. An optical sensor requires a direct line of sight to detect the wavelength emitted from an object.

Accordingly, to detect the wavelengths emitted from a critical component of a turbine, the conventional technique was to place a long thin pipe through holes cut in the wall of the turbine. This pipe had to be directed at the object of interest and the optical sensor was at the end of the pipe located outside the turbine.

With the present invention and especially with a flexible heat pipe 20, the sensing device can be placed anywhere inside the aggressive environment and the optical sensor can be directed anywhere, while being much closer to the object of interest because it can be placed inside the turbine.

Instead of a window 50 on the first end 19 of the heat pipe 20, a semi-permeable membrane 52(shown on the second end 21 in FIG. 1) can be used on both ends 19 and 21 of the heat pipe 20. This membrane 52 allows only specific gas species into the heat pipe 20. For example, a membrane 52 can permit only oxygen to pass into the heat pipe 20 for an oxygen sensor to determine the oxygen content in the working gas of a turbine. The oxygen will then be allowed to pass through the heat pipe 20 on the second end 21 of the sensing device.

A preferred embodiment of the sensing device of the present invention allows condensate in the working gas of a turbine to flow through the heat pipe 20 to measure the oxygen/pH value of the condensate. The sensor 10 is a standard oxygen/pH measuring cell and the condensate will flow though the heat pipe 20 at a low flow rate so that the pipe can cool the condensate as required before it reaches the cell.

There is a need for continuous oxygen/pH measurements of condensate in low pressure turbines because oxygen and acidity are key environmental factors contributing to the on-set of stress-corrosion cracking and corrosion-assisted fatigue cracking. These problems are often the cause of extensive repairs. Additionally, quick and effective measurement of oxygen and pH could lead to quicker evaluation of feedwater treatment strategies, thus improving plant efficiency and yielding less down time due to maintenance of the turbine.

One of the problems with oxygen/pH sensors is that they are temperature dependent. This causes severe limitations in accuracy and reliability. Oxygen/pH measurements in low pressure turbines must be taken at temperatures near the boiling point of water as influenced by pressure. Ex-situ devices are subject to the ingress of oxygen, which occurs against positive pressure, giving unreliable results. The ability of the sensing device of the present invention to operate in-situ, however, helps overcome these limitations.

Another application of the sensing device of the present invention is to replace thermocouples in measuring a combustion turbine's exhaust temperatures. For practical reasons, there is a limited number of thermocouples that can be used to measure exhaust temperatures, which vary with time and location at a turbine's outlet end. As a result, significant error is encountered. A heat pipe 20 can be used to improve the accuracy of exhaust temperature measurements by averaging the temperature of the environment and thermoelectric sensors inside the heat pipe 20 can be used to measure the average temperature.

Figure 3:
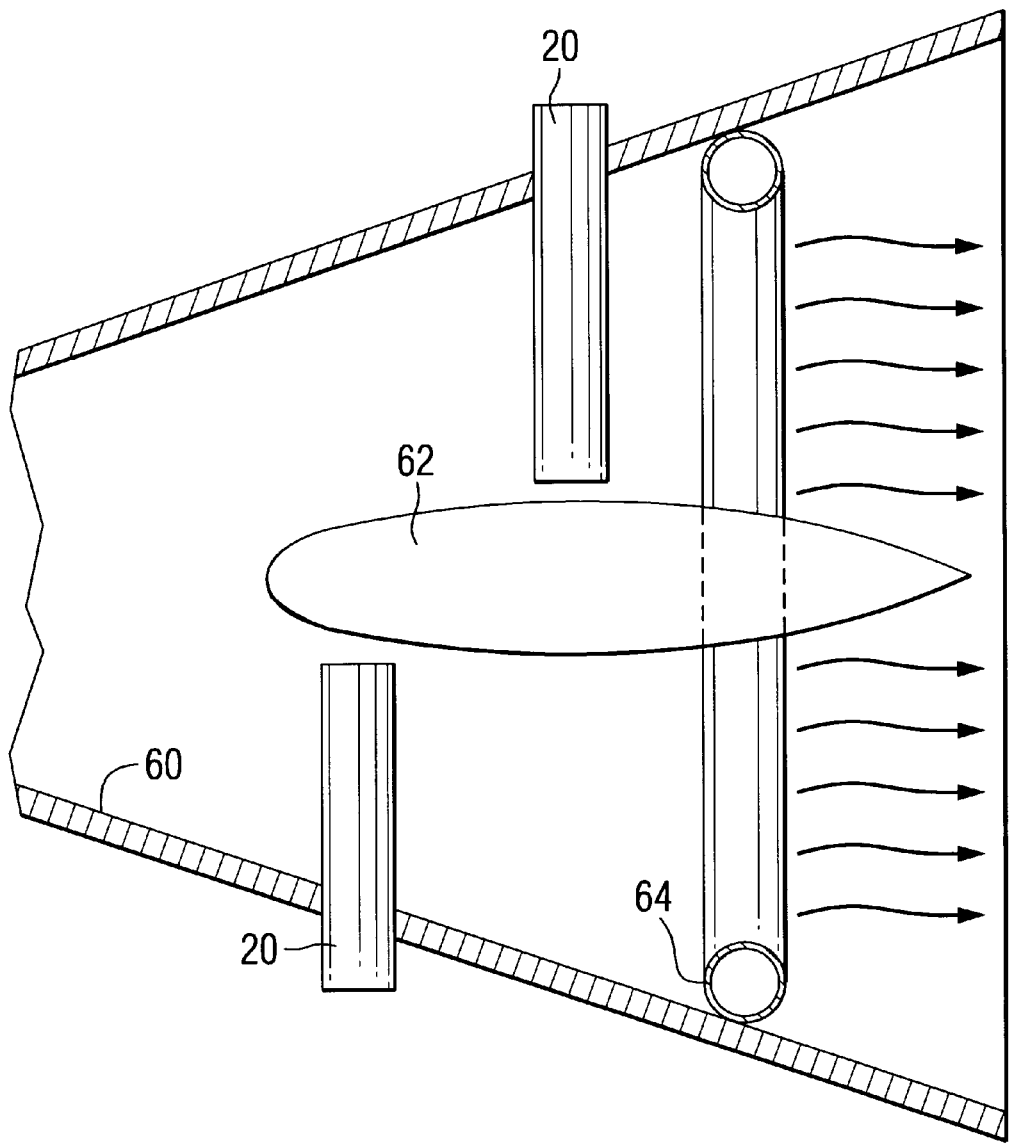
FIG. 3 is a cross-sectional, side view of an exhaust cylinder of a turbine, depicting two applications of the sensing device according to the present invention.

FIG. 3 is a cross-sectional, side view of an exhaust cylinder 60 of a turbine, depicting two applications of the sensing device according to the present invention. Heat pipes 20 may be arranged radially, extending from the exhaust cylinder 60 to the exit nozzle 62. These heat pipes 20 will average the temperature of this exhaust environment over this radial distance. A circumferential heat pipe 64 in the shape of a ring may also be situated about the inside circumference of the exhaust cylinder 60 to average the temperature about the circumference.

Because of the enhanced durability of the sensor 10 of the present invention, on-line monitoring capabilities are greatly improved. In addition, the heat pipe 20 can also be equipped with a lock so that the sensor 10 can be replaced without the need to remove the heat pipe 20 from a turbine.

Not only are the sensing devices practical for use in combustion turbines, but they can also be used in any harsh environment, such as all types of turbines and other power generation machines such as generators. In addition to the sensors 10 described above for use in the sensing device of the present invention, other sensors 10 include but are not limited to electromagnetic (for measuring proximity, cracks, conductivity or permeability), piezoelectric (for measuring acoustic or ultrasonic signals, vibration, or detecting cracks), semiconductor (for measuring Hall effect), CCD (Charge Coupled Device) (as an optical sensor, measuring ultraviolet light or infrared radiation), dielectric (for measuring insulating properties), magnetic (for measuring magnetic properties) and thermoelectric (for measuring temperature) sensors. The present invention also allows for electronic devices, such as those including transistor chips or circuitry made with semiconductor materials, to be placed inside the heat pipe 20 next to the sensor 10.

It is intended that if the heat pipe 20 is closed on both ends 19 and 21, a sample of working gas or species (allowed entry through a semipermeable membrane 52) can be taken and directed out of the turbine through an appropriate conduit. This is accomplished in a similar fashion to which the signals wires 14 from the sensor 10 are transmitted to a data acquisition system outside the turbine. In this way, the sample can be examined from outside the turbine.

The sensing device of the present invention provides an apparatus that can be used to protect sensors in the harsh environment of gas turbines so that the sensors can operate effectively. The sensing device makes the use of conventional sensors possible in harsh environments, such as inside combustion turbines. In addition, by improving the accuracy and reliability of sensor reading in harsh environments, the sensing devices optimize the use of critical components and thereby improve machine performance. By doing so, the present invention improves the feasibility and capability of on-line sensor technologies and provides new options for such applications.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. In a combustion turbine, a sensing device inside the turbine to protect a sensor mounted therein from environmental conditions present in the turbine, the sensing device comprising:

a heat pipe, located in the turbine and exposed to the environmental conditions, for protecting the sensor from the environmental conditions, said heat pipe having a length, a hollow side wall defining an annulus, and a center channel;

a sensor located in the center channel of said heat pipe; and a working fluid located in said annulus to aid in regulating heat along the length of the heat pipe.

2. The sensing device of claim 1, wherein the sensing device further comprises:

power wires extending from a power source outside the turbine to said sensor for supplying power to the sensor; and signal wires extending from said sensor to a data acquisition system outside the turbine for transmitting readings from said sensor to the data acquisition system.

3. The sensing device of claim 2, wherein said heat pipe further comprises:

a first end and a second end, wherein the heat pipe is open at both said first end and said second end.

4. The sensing device of claim 2, wherein said heat pipe further comprises:

a first end and a second end, wherein said heat pipe is closed at both said first end and said second end; and a window on said first end for said sensor to sense the environment through said window.

5. The sensing device of claim 4, wherein said sensor is an optical sensor.

6. The sensing device of claim 4, wherein said sensor is a thermal sensor.

7. The sensing device of claim 2, wherein said heat pipe further comprises:

a first end; and a semi-permeable membrane on said first end to allow entry of a specific species into said heat pipe for measurement by said sensor.

8. The sensing device of claim 2, wherein said heat pipe further comprises:

a first end; and a low flow inlet on said first end to allow a sample of working gas in the turbine to flow though the heat pipe at a low flow rate.

9. The sensing device of claim 8, wherein said sensor is an oxygen/pH measuring cell for measuring the oxygen and pH levels in condensate in the sample of working gas.

10. The sensing device of claim 6, wherein said heat pipe is located in an exhaust cylinder of the turbine and extends from an exhaust cylinder to an exit nozzle.

11. The sensing device of claim 6, wherein said heat pipe is in the shape of a ring and is situated about an inside circumference of an exhaust cylinder of the turbine.

* * * * *